United States Patent [19]
Lehtinen

[11] Patent Number: 5,516,270
[45] Date of Patent: May 14, 1996

[54] SIZING TOOL

[75] Inventor: Reijo Lehtinen, Kauhajoki, Finland

[73] Assignee: JRT-Finland Oy, Topeeka, Finland

[21] Appl. No.: 241,672

[22] Filed: May 12, 1994

Related U.S. Application Data

[63] Continuation of Ser. No. 836,301, filed as PCT/FI90/00214, Sep. 12, 1990, abandoned.

[30] Foreign Application Priority Data

Sep. 22, 1989 [FI] Finland ................... 894484

[51] Int. Cl.$^6$ ................... B29C 47/90
[52] U.S. Cl. ................... 425/71; 264/178 R; 264/209.4; 264/560; 264/562; 264/564; 264/568; 425/326.1; 425/388; 425/392
[58] Field of Search ................... 425/67, 71, 326.1, 425/387.1, 388, 392; 264/178 R, 209.3, 209.4, 560, 562, 564, 565, 566, 568

[56] References Cited

U.S. PATENT DOCUMENTS

| | | | |
|---|---|---|---|
| T873,007 | 4/1970 | Bennett et al. | |
| 3,169,272 | 2/1965 | Maxson | 425/388 |
| 3,187,383 | 6/1965 | Bacchus et al. | 425/67 |
| 3,212,135 | 10/1965 | Branscum | 264/209.4 |
| 3,229,005 | 1/1966 | Reifenhauser | 264/209.4 |
| 3,248,463 | 4/1966 | Wiley et al. | 264/568 |
| 3,288,317 | 11/1966 | Wiley | 264/568 |
| 3,532,780 | 10/1970 | Kakutani et al. | 425/71 |
| 3,546,745 | 12/1970 | Ball | 425/71 |
| 3,668,288 | 6/1972 | Takahashi | 264/209.4 |
| 4,063,705 | 12/1977 | Vodra | 425/388 |
| 4,543,051 | 9/1985 | Maillefer | 425/71 |
| 4,808,098 | 2/1989 | Chan et al. | 425/326.1 |
| 5,085,567 | 2/1992 | Neumann | 425/71 |

FOREIGN PATENT DOCUMENTS

| | | | |
|---|---|---|---|
| 55-55833 | 4/1980 | Japan | 264/560 |
| 959440 | 6/1964 | United Kingdom . | |
| 1456222 | 11/1976 | United Kingdom . | |

OTHER PUBLICATIONS

SPE Journal, Oct. 1964, pp. 1093–1097.

*Primary Examiner*—Jay H. Woo
*Assistant Examiner*—Joseph Leyson
*Attorney, Agent, or Firm*—Armstrong, Westerman, Hattori, McLeland & Naughton

[57] ABSTRACT

A sizing tool for extruding plastic tubing is disclosed. The tool includes a peripheral wall having an inner surface that defines the outer dimension of a plastic tubing advancing from an extruder through the tool under influence of an internal pressure exceeding the pressure prevailing in the tool. The tool also includes a lubricating water channel system in the peripheral wall and extending along the tool length and having at least one opening communicating with the inner surface of said peripheral wall. The tool also includes a cooling medium channel system in the peripheral wall and extending along the length. The cooling medium channel system being substantially closed within the peripheral wall and being separate from the lubricating water channel system.

16 Claims, 3 Drawing Sheets

SIZING TOOL

This application is a continuation of application Ser. No. 07/836,301 filed as PCT/FI90/00214, Sep. 12, 1990, now abandoned.

BACKGROUND OF THE INVENTION

The present invention relates to a sizing tool for sizing the outer dimensions of an extruded tubing.

The sleeve-like sizing tools of said type are placed immediately after a tubing extruder, in a specific sizing and cooling vat.

The operation of the tools complies with two principles. According to one principle, a tubing in a forming state and leaving the extruder is pressed against the inner surface of the sizing tool by means of pressure developed inside the tubing. The other operating principle requires a work chamber under vacuum, in which chamber the sizing tool is placed. The wall of the tool is provided with through channels, via which the vacuum prevailing in the work chamber can affect the outer surface of the tubing in the sizing tool. The tubing is then sucked against the inner surface of the tool.

For cooling the tubing, the tool is either immersed in water acting as a coolant medium or the tool is subjected to a constant water shower.

From the point of view of a satisfactory operation of sizing tools, it is essential that the tubing passes through the tool as free from friction as possible and that the tubing leaving the extruder is correctly cooled for achieving the desired dimensions and dimensional stability.

For achieving these objects, different lubricating and cooling solutions have been developed for sizing tools. These solutions related to sizing tools operating both under an internal pressure and an external vacuum have been described in patent literature to a great extent.

The sizing tool according to this invention can be adapted to be used both in pressure and vacuum systems. When it is used in a vacuum system, the wall of the sizing tool must be provided with pressure passages.

A sizing tool provided with pressure passages and a channel system communicating with the inner surface of the tool for leading lubricating water essentially along the whole tool length between the outer surface of the tubing and the inner surface of the tool is known and described e.g. in the U.S. Pat. No. 4,543,051.

In the sizing tool described in said reference publication, the cooling is mainly based on the effect of cooling water in the sizing vat, although the lubricating water naturally participates in the cooling. However, arranging the cooling and the lubrication in said manner limits the tool capacity, nor does it provide a possibility of adjusting the cooling without a detrimental effect on the lubrication.

SUMMARY OF THE INVENTION

For eliminating these problems, the sizing tool is in accordance with the invention furnished with a separate cooling channel system independent of the conditions of cooling outside the tool, which system essentially extends along the whole length of the sizing tool.

In accordance with an essential additional feature of the invention, the sizing tool is also provided with a separate vacuum channel system similarly independent of the conditions outside the sizing tool. The other characteristic features of the invention are described in the appended patent claims.

BRIEF DESCRIPTION OF THE DRAWINGS

The invention is next described with reference to the accompanying drawing, in which.

DESCRIPTION OF THE PREFERRED EMBODIMENTS

Figure 1:
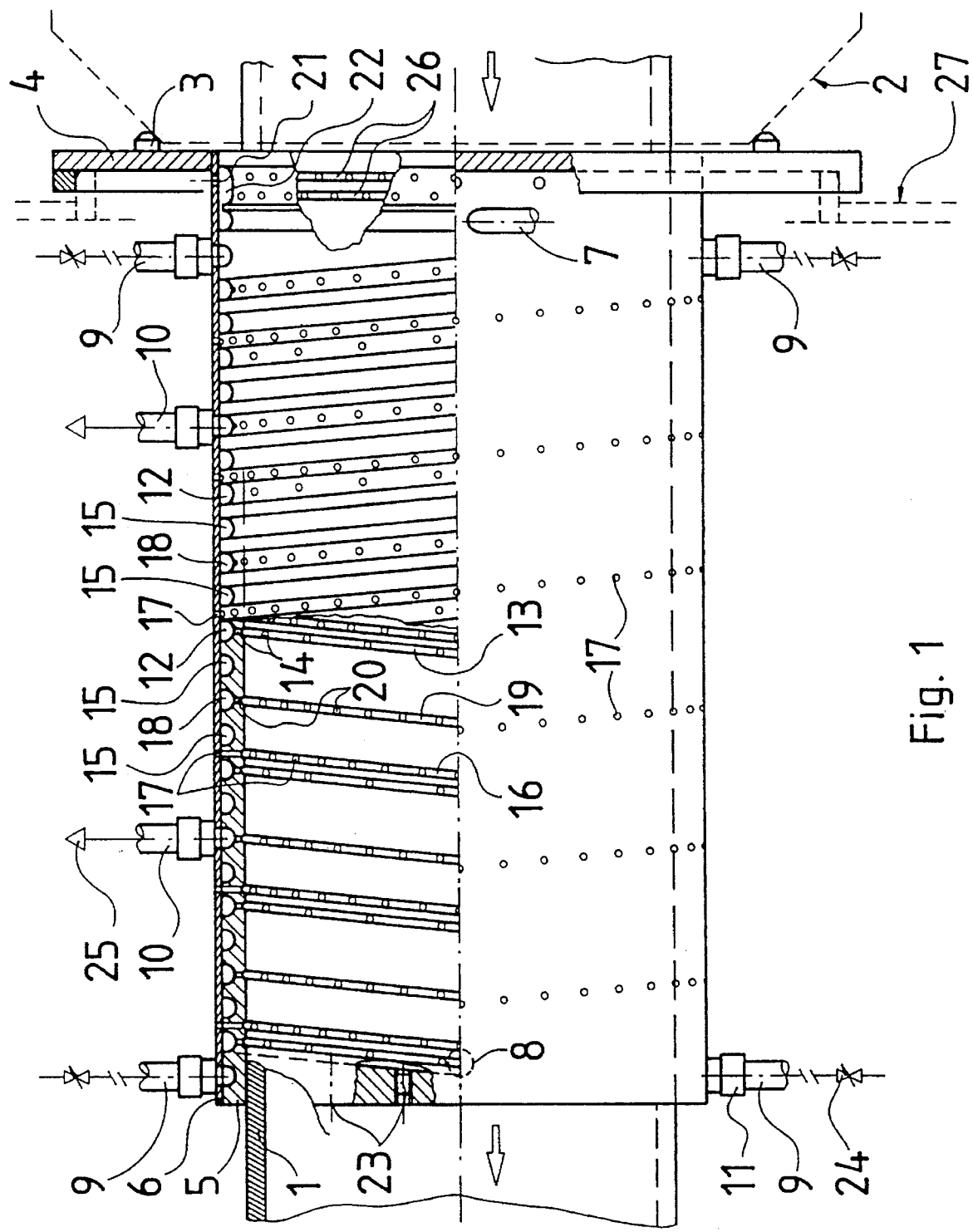
FIG. 1 is a partially sectional side elevation of an embodiment of the inventive sizing tool.

A plastic tubing 1 to be sized is introduced into a sizing tool according to FIG. 1 from an extruder, which is not shown in the figure, but which is placed immediately in the right edge of the figure. The sizing tool is placed after a nozzle (2) of the press head of the extruder. The whole sizing tool is placed in a so-called sizing vat, which is an essentially closed chamber larger than the sizing tool, in which chamber, during operation, a certain vacuum as well as a cooling water level is maintained in such a way that the sizing tool is totally immersed in the cooling water. The cooling can alternatively be based on water showers, which rinse the sizing tool and the tubing protruding therefrom. The sized tubing is thus subjected to aftercooling when passing through the water or water showers in the chamber.

On the other hand, the inside of the tubing to be made can be arranged to be maintained at a pressure exceeding the environmental pressure, whereby the sizing occurs through this internal pressure, which pressure presses the tubing wall against the inner surface of the tool.

For the operation mode under vacuum, several bores 17 have been made through the tool wall, via which the vacuum prevailing in the sizing chamber can affect the inside of the sizing tool and suck the tubing to be sized against the inner surface of the tool wall.

First after a connecting flange 4, the sizing tool comprises a lubricating water chamber 22 annularly enclosing the tool. The lubricating water (which naturally has a cooling effect at the same time) is fed into this chamber via two opposite connections 7 placed tangentially to the outer surface of the wall. The bottom of the lubricating water chamber 22 has several through holes, via which water can enter between the outer surface of the tubing and inner surface of the sizing tool.

For improving the lubrication effect and extending it along the whole tool length, the tool is provided with an additional channel system 12 as an extension to the annular lubricating water chamber 22, into which channel system 12 lubricating water is led from the chamber 22 and from which lubricating water is led through holes in the channel system between the tubing and the inner surface of the tool. The channel system is extended essentially along the whole tool length and provided with its own adjusting devices 24 for achieving the correct lubricating conditions. For increasing the flow rate of the lubricating water and for equalizing the pressure, the annular chamber 22 of the initial end is furnished with overflow openings 21, through which water in excess relative to the lubrication purpose can be led to the sizing vat. A larger flow rate essentially intensifies the cooling of the inlet section. The supply of the lubricating water in the opposite direction is also possible.

In order to achieve a more controlled and efficient cooling for the tool, the tool according to the invention is furnished with separately adjusted, closed cooling-medium channels 15. The channel systems can, subject to the properties required by the product, have several operational modes e.g. with respect to the direction and distribution of the cooling circulation.

The inventive sizing tool is further especially characterized by a separate suction channel system 18. By means of a vacuum led through this suction channel system, the effect of the vacuum prevailing in the sizing vat can be intensified, the operation caused by the pressure of the inner side of the tubing can be aided, and in certain cases, the pressing of the tubing against the inner surface of the sizing tool can be solely achieved. This channel system has its own adjusting means 25.

It is preferable to arrange said channel systems as grooves advancing on the outer periphery of a sleeve 5 forming the body of the sizing tool. These grooves are covered by a covering housing 6. The covering housing 6 can be mounted in position by means of modes known per se, one of which is a shrink fit.

The channels are placed to pass on the periphery of the sizing tool alternately side by side, whereby there are basically two possibilities for their positioning essentially along the whole sizing-tool length. FIG. 1 shows a screw-line positioning, wherein each channel system extends as a one-head screw. Positioning comprising two or several heads is also possible. The head configuration of each screw figure related to each channel system and the applied dimensions of the channel systems define the screw pitch.

Figure 2:
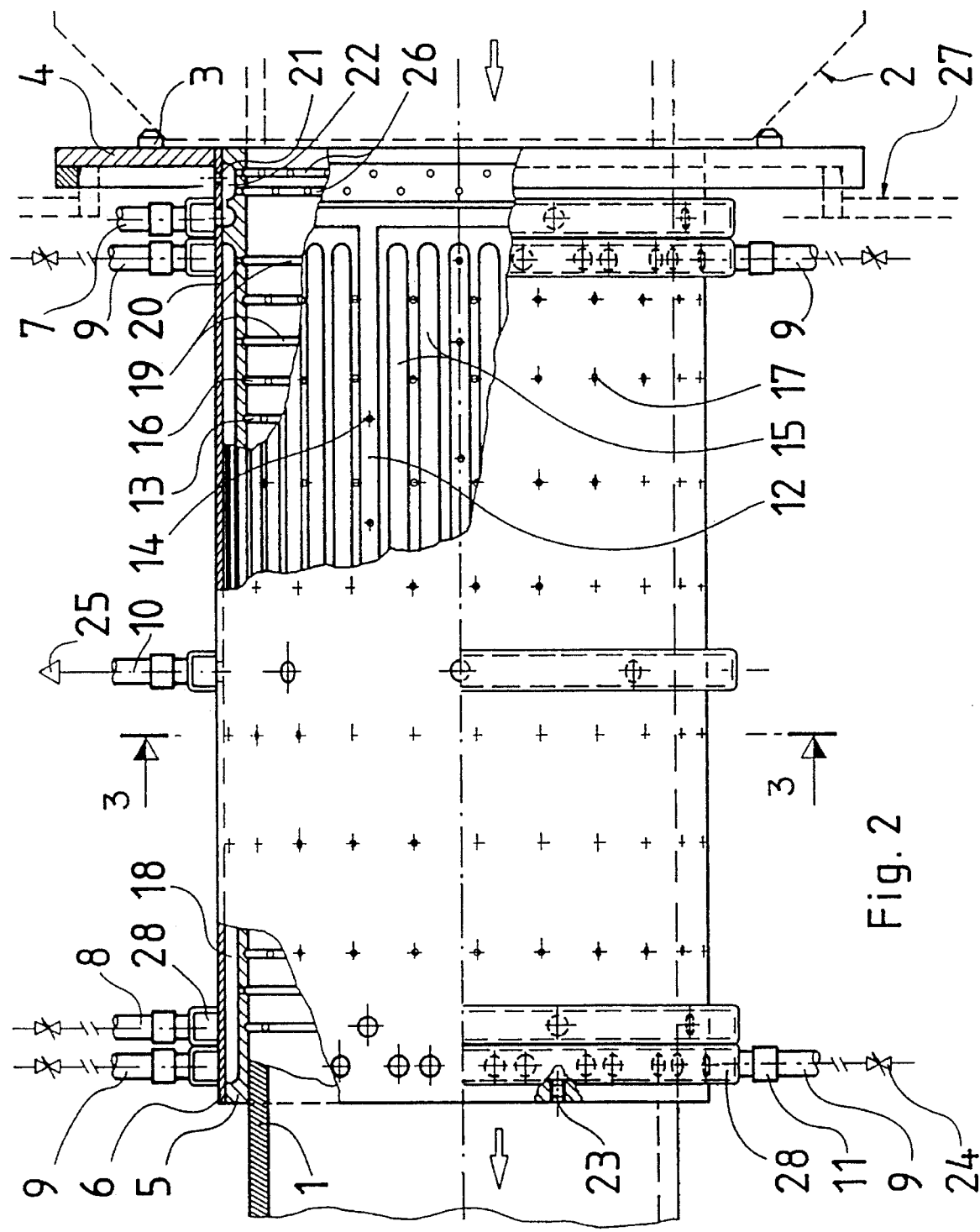
FIG. 2 is also a partially sectional view of another embodiment of the inventive sizing tool.
Figure 3:
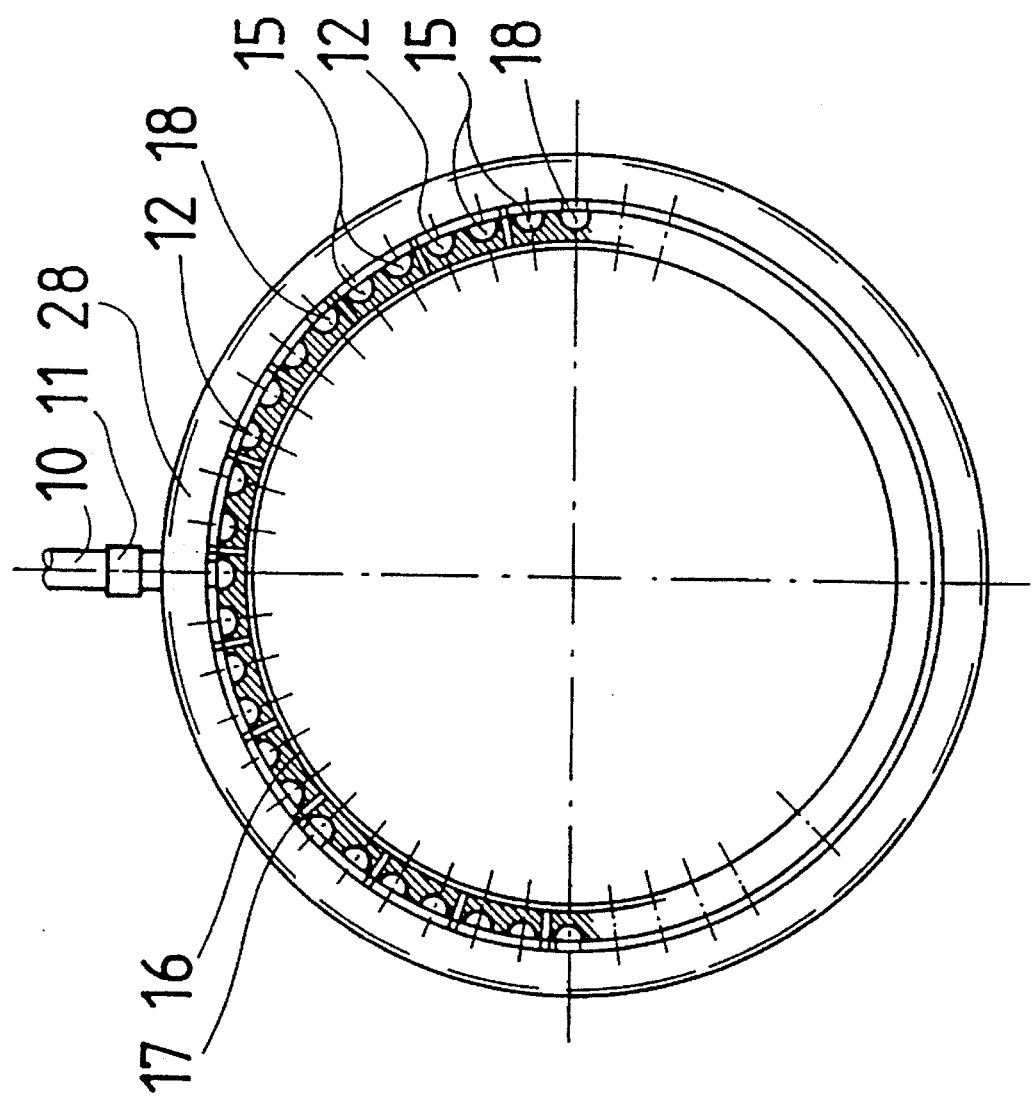
FIG. 3 is a cross-section of the sizing tool of FIG. 2 at section A—A.

Another possibility of positioning the channels is in the axial direction of the sizing tool, which alternative is illustrated in FIG. 2 and 3.

There are operational differences between the positioning modes of said channel systems mainly relative to the flows of the liquid channels. A threaded positioning produces long channels, in which high flow velocities can be utilized. In addition to cooling properties, a high flow velocity is characterized by the fact that the channels remain clean. In a linear positioning, in contrast, high volume flows are easily produced, which on their part result in a high efficiency relative to cooling.

With respect to the device configuration, a diverse positioning of the channels causes differences mainly relative to the positioning of the connections. In the threaded mode, the connections are open directly to each channel, either directly to its initial and/or terminal end or potentially also between its ends. In the linear positioning, in contrast, it is preferable to use manifolds surrounding the sizing tool, which manifolds communicate with each channel (lubrication, cooling, suction).

For extending the effect of the channels (or through-bore rows) placed on the outer periphery of the sleeve 5 and provided with passages through the sleeve wall as uniformly and efficiently as possible on the work surface of the sizing tool, i.e. on its inner surface, grooves have been formed on the inner surface at the through holes of the channels. In the threaded positioning of the channels, the grooves of the inner surface advance uninterruptedly at a point corresponding to the peripheral groove, whereas in the linear positioning, the internal grooves are placed as separate annular grooves spaced apart in the axial direction.

The placement of separate operational channel systems on the periphery of the sizing tool produces several operational advantages in comparison with known devices. First of all, the extension of the lubricating channels along the whole sizing-tool length ensures a proper lubrication and thereby a very low-friction passage through the tool. A separate channel system also makes an independent lubrication control possible.

From the point of view of operation, an especially important feature of the sizing tool is the separate cooling medium channel system. Cooling can, first of all, be intensified by means of the channels in comparison with the vat cooling of prior art, and especially, the cooling effect can be adjusted independent of the vat cooling. The cooling can even be reversed relative to the direction of the efficiency of the cooling, which can be achieved by changing the cooling-water supply from the inlet to the outlet or vice versa.

A totally closed cooling circulation makes the use of other coolants than water possible, which fact can be of importance in circumstances, wherein the supply of cooling water is not sufficiently available. The cooling circulation can also be combined with a separate cooling system.

A separate and separately adjusted suction channel system makes different operational modes possible. By means of the vacuum directed from an independent channel system to the tubing, the effect of the pressure prevailing in the vat space can be intensified, whereby the pressure of the vat space can possibly be maintained nearer to the outdoor pressure. A similar effect is also achieved in connection with pressure sizing. A separate vacuum channel system is very important from the point of view of the start-up of the equipment, which facilitates and speeds up the start-up phase both in connection with vacuum and pressure sizing.

I claim:

1. A sizing tool for sizing extruded plastic tubing, comprising:

a peripheral wall having an inner surface that defines the outer dimension of a plastic tubing and having a length defined between a plastic tubing inlet at one end of said peripheral wall and a plastic tubing outlet at an opposite end of said peripheral wall;

a lubricating water channel system in said peripheral wall which includes at least one continuous lubricating channel in said peripheral wall extending along substantially the whole of said length and having at least one opening communicating said lubricating channel with said inner surface of said peripheral wall;

a cooling medium channel system also in said peripheral wall which includes at least one continuous channel in said peripheral wall extending substantially along the whole of said length, said cooling medium channel system being closed within said peripheral wall and being separate from said lubricating water channel system;

each of said at least one cooling medium channel and said at least one lubricating water channel being distributed around a periphery of the peripheral wall; and means for pressing the plastic tubing against said inner surface of said peripheral wall.

2. A sizing tool according to claim 1, wherein said means for pressing includes a separate suction channel system in said peripheral wall extending along substantially the whole of said length, said separate suction channel system including at least one continuous separate suction channel distributed around the periphery of the peripheral wall and having at least one opening communicating said separate suction channel with said inner surface of said peripheral wall, said separate suction channel system being separate from each of said lubricating water channel system and said cooling medium channel system.

3. A sizing tool according to claim 1 or 2, wherein said means for pressing includes pressure passages extending through said peripheral wall and including openings on said inner surface so as to expose the plastic tubing to a vacuum prevailing outside the tool; said pressure passages also being distributed around the periphery of the peripheral wall.

4. A sizing tool according to claim 2, wherein said channels of said lubricating water channel system, said cooling medium channel system and said suction channel system are threaded around the peripheral wall in the direction of said length.

5. A sizing tool according to claim 2, wherein said channels of said lubricating water channel system, said cooling medium channel system and said suction channel system extend in the direction of said length and are alternately distributed around substantially the whole peripheral wall.

6. A sizing tool according to claim 3, wherein said pressure passages are located in a plurality of rows, and said rows of pressure passages and said channels of said channel systems extend in an alternately distributed pattern generally parallel to one another.

7. A sizing tool according to claim 3, further including a plurality of grooved channel systems formed on said inner surface of said peripheral wall each communicating with said openings of a respective one of said lubricating water channel system, said suction channel system and said pressure passages.

8. A sizing tool according to claim 7, wherein each of said grooved channel systems extend in a pattern substantially parallel to one another.

9. A sizing tool according to claim 3, further including a plurality of annular grooves spaced apart in the direction of said length, a respective one of said grooves communicating with said openings of a respective one of said channel systems or said pressure passages.

10. A sizing tool according to claim 1 or 2, wherein said peripheral wall includes a sleeve,
  channel systems are formed as grooves formed in said sleeve, and wherein said peripheral wall also includes a covering housing on the outer surface of said sleeve, said covering housing covering said grooves.

11. A sizing tool according to claim 6, wherein said pattern is a threaded pattern around the sizing tool.

12. A sizing tool according to claim 6, wherein said pattern is a linear pattern extending generally parallel to the direction of said length.

13. A sizing tool according to claim 1, wherein said channels of said lubricating water channel system and said cooling medium channel system are threaded around the peripheral wall in the direction of said length.

14. A sizing tool according to claim 1, wherein said channels of said lubricating water channel system and said cooling medium channel system extend in the direction of said length and are alternately distributed around substantially the whole peripheral wall.

15. A sizing tool according to claim 4, wherein said means for pressing includes at least one row of pressure passages which extend through to said inner surface of said peripheral wall, said at least one row of pressure passages and said channels of said channel systems extending in a side by side pattern generally parallel to one another, and said side by side pattern including a first of said at least one row being adjacent said channel of the cooling medium channel system, said cooling medium channel being adjacent said channel of the suction channel system, said suction channel being adjacent a second cooling medium channel of the cooling medium channel system, and said second cooling medium channel being adjacent said lubricating water channel of the lubricating water channel system.

16. A sizing tool according to claim 5, wherein said means for pressing includes a plurality of rows of pressure passages which extend through to said inner surface of said peripheral wall, said rows of pressure passages and said channels of said channel systems extending in a side by side pattern generally parallel to one another, and said side by side pattern including a first of said rows of pressure passages being adjacent said channel of the cooling medium channel system, said cooling medium channel being adjacent said channel of the suction channel system, said suction channel being adjacent a second cooling medium channel of the cooling medium channel system, and said second cooling medium channel being adjacent said lubricating water channel of the lubricating water channel system.

* * * * *